(12) United States Patent
Qiu et al.

(10) Patent No.: US 7,620,153 B2
(45) Date of Patent: Nov. 17, 2009

(54) CAGE FOR X-RAY TUBE BEARINGS

(75) Inventors: Liangheng Qiu, Waukesha, WI (US);
Myles Standish Peterson, II, Delanson, NY (US); Carey Shawn Rogers, Brookfield, WI (US); Dalong Zhong, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 22 days.

(21) Appl. No.: 11/747,562

(22) Filed: May 11, 2007

(65) Prior Publication Data

US 2008/0279335 A1 Nov. 13, 2008

(51) Int. Cl.
*H01J 35/10* (2006.01)
(52) U.S. Cl. ................ 378/132; 378/119
(58) Field of Classification Search ......... 378/132–133, 378/119
See application file for complete search history.

(56) References Cited

U.S. PATENT DOCUMENTS

| 5,150,398 | A | * | 9/1992 | Nishioka et al. | 378/132 |
|---|---|---|---|---|---|
| 5,696,808 | A | * | 12/1997 | Lenz | 378/121 |
| 5,752,773 | A | * | 5/1998 | Rosado et al. | 384/527 |
| 5,773,147 | A | | 6/1998 | Sundberg | |
| 6,585,483 | B2 | * | 7/2003 | Feest | 415/122.1 |
| 6,726,993 | B2 | | 4/2004 | Teer et al. | |
| 2004/0179762 | A1 | * | 9/2004 | Doll et al. | 384/492 |
| 2005/0276530 | A1 | * | 12/2005 | Chen et al. | 384/536 |

* cited by examiner

*Primary Examiner*—Hoon Song
(74) *Attorney, Agent, or Firm*—Ziolkowski Patent Solutions Group, SC (57) ABSTRACT

A bearing assembly mounted in an x-ray tube includes a bearing race and a plurality of bearing balls positioned adjacent to the bearing race. The plurality of bearing balls are positioned within a bearing cage. The bearing cage is configured to evenly space the bearing balls within the bearing cage and prevent contact between adjacent bearing balls, thereby eliminating the problems of skidding wear and dynamic impact load between adjacent bearing balls in the bearing assembly.

14 Claims, 6 Drawing Sheets

CAGE FOR X-RAY TUBE BEARINGS

BACKGROUND OF THE INVENTION

The present invention relates generally to x-ray tubes and, more particularly, to an x-ray tube bearing assembly having a bearing cage therein.

X-ray systems typically include an x-ray tube, a detector, and a bearing assembly to support the x-ray tube and the detector. In operation, an imaging table, on which an object is positioned, is located between the x-ray tube and the detector. The x-ray tube typically emits radiation, such as x-rays, toward the object. The radiation typically passes through the object on the imaging table and impinges on the detector. As radiation passes through the object, internal structures of the object cause spatial variances in the radiation received at the detector. The detector then emits data received, and the system translates the radiation variances into an image, which may be used to evaluate the internal structure of the object. One skilled in the art will recognize that the object may include, but is not limited to, a patient in a medical imaging procedure and an inanimate object as in, for instance, a package in a computed tomography (CT) package scanner.

X-ray tubes include a rotating anode structure for the purpose of distributing the heat generated at a focal spot. The anode is typically rotated by an induction motor having a cylindrical rotor built into a cantilevered axle that supports a disc-shaped anode target and an iron stator structure with copper windings that surrounds an elongated neck of the x-ray tube. The rotor of the rotating anode assembly is driven by the stator. An x-ray tube cathode provides a focused electron beam that is accelerated across an anode-to-cathode vacuum gap and produces x-rays upon impact with the anode. Because of the high temperatures generated when the electron beam strikes the target, it is necessary to rotate the anode assembly at high rotational speed. This places stringent demands on the bearing assembly, which includes tool steel ball bearings and tool steel raceways.

Bearings used in x-ray tubes are required to operate in a vacuum, which precludes lubricating with conventional wet bearing lubricants such as grease or oil. X-ray tube bearing rolling elements (i.e., bearing balls) are typically coated with a solid layer, or tribological system, of a metal with lubricating properties, such as silver, lead, or lead-tin. The lubricating metal that coats the bearing balls helps to reduce friction between adjacent balls and between the balls and the raceway. Despite the lubricating metal coating, however, a large amount of friction and heating is present at contact points between the balls and the raceway. The operating conditions in the x-ray tube environment, where temperatures in the vacuum environment range from 300-500 degrees Celsius and stress levels on the bearing balls can exceed 2.5 GPa, creates yet additional challenges for the bearing.

Failure of a bearing in an x-ray tube is typically by wear of the plated silver and loss of the silver from a contact region between adjacent bearing balls and between the bearing balls and the raceway. Wear of the plated silver can occur because the balls in the bearing are not evenly spaced around the raceway and the ball-to-ball space positions are changed when the bearing is running. When a bearing ball is transitioned from a load zone to a non-load zone in the bearing, the ball rapidly moves out of the load zone and hits an adjacent ball due to load release. This load release results in a large impact load between adjacent bearing balls. The impact load damages a ball surface by causing indentations on the surface at the ball-to-ball contact point. Additionally, the rotation of adjacent bearing balls are opposite to one another. The rotational velocity of the ball surfaces, in inverse directions, creates high skidding torque and heat build-up when the adjacent balls contact one another. The high skidding velocities and internal heat created by ball-to-ball contact causes tremendous wear and lubrication damage so as to reduce bearing life. Thus, impact indentations, skidding wear, and heat build-up all serve to affect bearing performance and durability.

Therefore, it would be desirable to have a method and apparatus to eliminate the problems of skidding wear and dynamic impact load between adjacent balls in a bearing assembly. It would also be desirable to reduce bearing internal torque and minimize heat build-up so as to improve bearing performance and extend bearing life.

BRIEF DESCRIPTION OF THE INVENTION

The present invention provides a method and apparatus for positioning bearing balls in an x-ray tube bearing assembly that overcome the aforementioned drawbacks. A bearing cage is included in the bearing assembly that spaces the bearing balls within the bearing cage to prevent contact between adjacent bearing balls, thereby eliminating skidding wear and dynamic impact load between adjacent balls and reducing bearing internal torque and heat build-up.

According to one aspect of the present invention, a bearing assembly mounted in an x-ray tube includes a bearing race, a plurality of bearing balls positioned adjacent to the bearing race, and a bearing cage positioned about the plurality of bearing balls.

According to another aspect of the present invention, an imaging system includes an x-ray detector, an x-ray tube having a rotatable shaft, and a bearing assembly supporting the rotatable shaft. The bearing assembly further includes a bearing race, a plurality of rolling elements positioned adjacent to the bearing race, and a bearing cage configured to house the plurality of rolling elements.

According to yet another aspect of the present invention, an x-ray tube bearing includes a raceway having an inner race and an outer race, a retainer positioned between the inner race and the outer race at each of a first end and a second end of the raceway, and a plurality of bearing balls within the retainer.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

The operating environment of the present invention is described with respect to the use of an x-ray tube as used in a computed tomography (CT) system. However, it will be appreciated by those skilled in the art that the present invention is equally applicable for use in other systems that require the use of an x-ray tube. Such uses include, but are not limited to, x-ray imaging systems (for medical and non-medical use), mammography imaging systems, and RAD systems.

Moreover, the present invention will be described with respect to use in an x-ray tube. However, one skilled in the art will further appreciate that the present invention is equally applicable for other systems that require operation of a bearing in a high vacuum, high temperature, and high contact stress environment, wherein a solid lubricant, such as silver, is plated on the rolling contact components. The present invention will be described with respect to a "third generation" CT medical imaging scanner, but is equally applicable with other CT systems, such as a baggage scanner.

Figure 1:
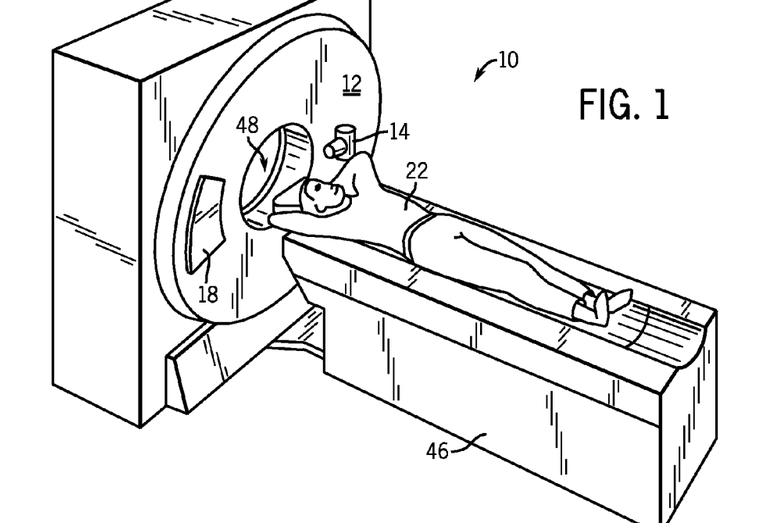
FIG. 1 is a pictorial view of a CT imaging system that can benefit from incorporation of an embodiment of the present invention.
Figure 2:
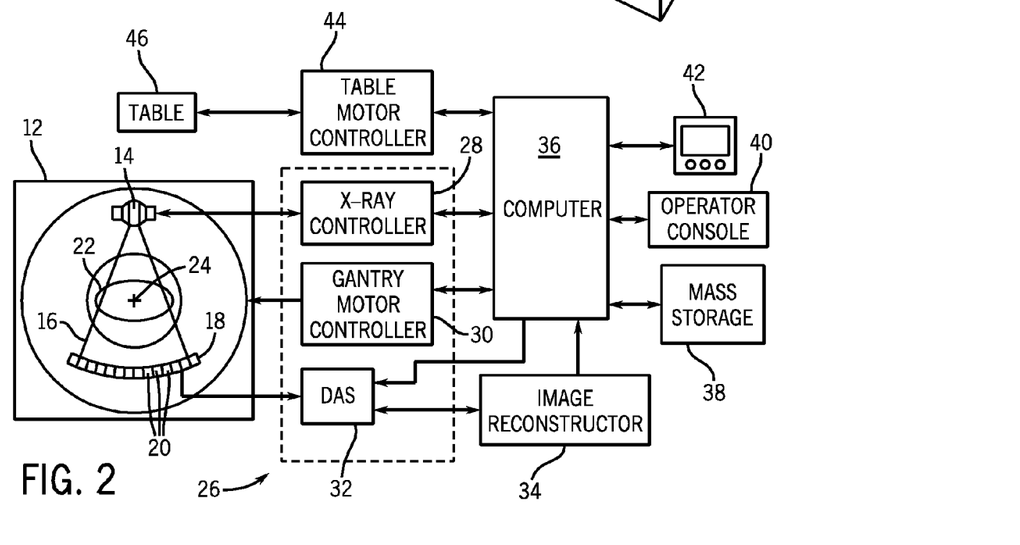
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray tube 14 that projects a beam of x-rays 16 toward a detector array 18 on the opposite side of the gantry 12. Detector array 18 is formed by a plurality of detectors 20 which together sense the projected x-rays that pass through a medical patient 22. Each detector 20 produces an electrical signal that represents the intensity of an impinging x-ray beam and hence the attenuated beam as it passes through the patient 22. During a scan to acquire x-ray projection data, gantry 12 and the components mounted thereon rotate about a center of rotation 24.

Rotation of gantry 12 and the operation of x-ray tube 14 are governed by a control mechanism 26 of CT system 10. Control mechanism 26 includes an x-ray controller 28 that provides power and timing signals to an x-ray tube 14 and a gantry motor controller 30 that controls the rotational speed and position of gantry 12. A data acquisition system (DAS) 32 in control mechanism 26 samples analog data from detectors 20 and converts the data to digital signals for subsequent processing. An image reconstructor 34 receives sampled and digitized x-ray data from DAS 32 and performs high speed reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 and gantry 12. Particularly, table 46 moves portions of patient 22 through a gantry opening 48.

Figure 3:
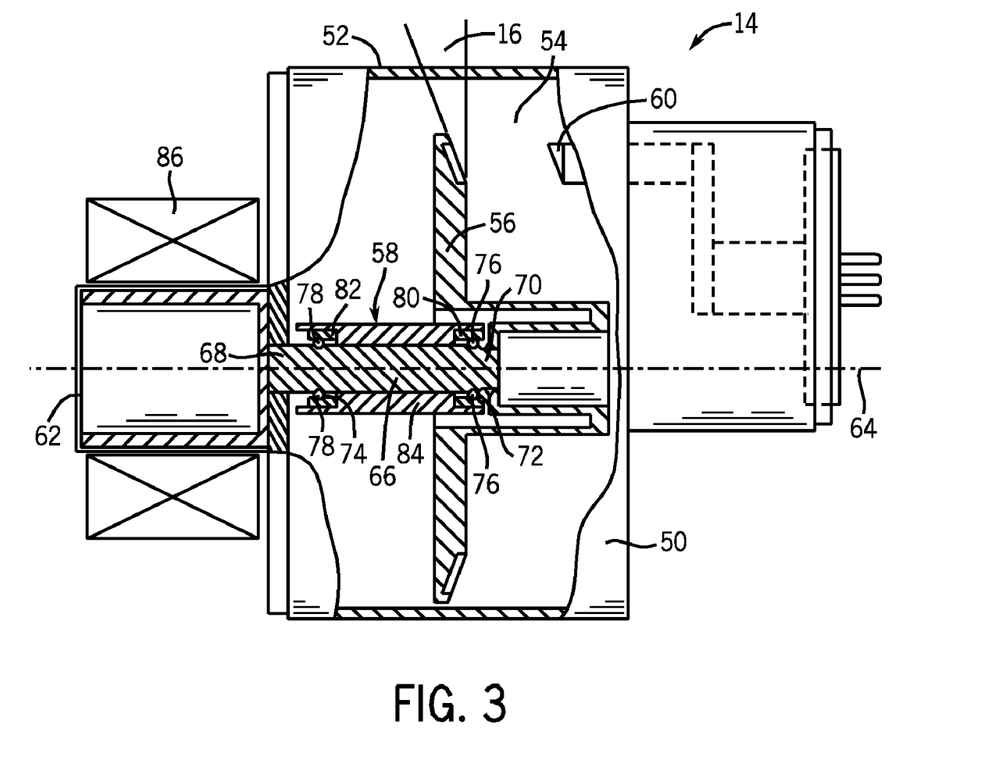
FIG. 3 is a cross-sectional view of an x-ray tube useable with the system illustrated in FIG. 1.

FIG. 3 illustrates a cross-sectional view of an x-ray tube 14 that can benefit from incorporation of an embodiment of the present invention. The x-ray tube 14 includes a casing 50 having a radiation emission passage 52 formed therein. The casing 50 encloses a vacuum 54 and houses an anode 56, a bearing assembly 58, a cathode 60, and a rotor 62. X-rays 16 are produced when high-speed electrons are suddenly decelerated when directed from the cathode 60 to the anode 56 via a potential difference therebetween of, for example, 60 thousand volts or more in the case of CT applications. The x-rays 16 are emitted through the radiation emission passage 52 toward a detector array, such as detector array 18 of FIG. 2. To avoid overheating the anode 56 from the electrons, an anode 56 is rotated at a high rate of speed about a centerline 64 at, for example, 90-250 Hz.

The bearing assembly 58 includes a center shaft 66 attached to the rotor 62 at first end 68 and attached to the anode 56 at second end 70. A front inner race 72 and a rear inner race 74 of center shaft 66 rollingly engage a plurality of front balls 76 and a plurality of rear balls 78 (i.e., bearing balls), respectively, that function as rolling elements. Bearing assembly 58 also includes a front outer race 80 and a rear outer race 82 configured to rollingly engage and position, respectively, the plurality of front balls 76 and the plurality of rear balls 78. Bearing assembly 58 includes a stem 84 which is supported by the x-ray tube 14. Stator 86 drives rotor 62, which rotationally drives anode 56.

In addition to rotation of the anode 56 within x-ray tube 14, the x-ray tube 14 as a whole is caused to rotate about gantry 12 at rates of, typically, 1 Hz or faster. The rotational effects of both the x-ray tube 14 about the gantry 12 and the anode 56 within the x-ray tube 14 cause the anode 56 weight to be compounded significantly, hence leading to operating contact stresses in the races 72, 74, 80, 82 (i.e., a raceway) and bearing balls 76, 78 of up to 2.5 GPa. Additionally, heat generated from operation of the cathode 60, the resulting deceleration of electrons in anode 56, and heat generated from frictional self-heating of the races 72, 74, 80, 82 and bearing balls 76, 78 to operate typically above 400 degrees Celsius.

Figure 4:
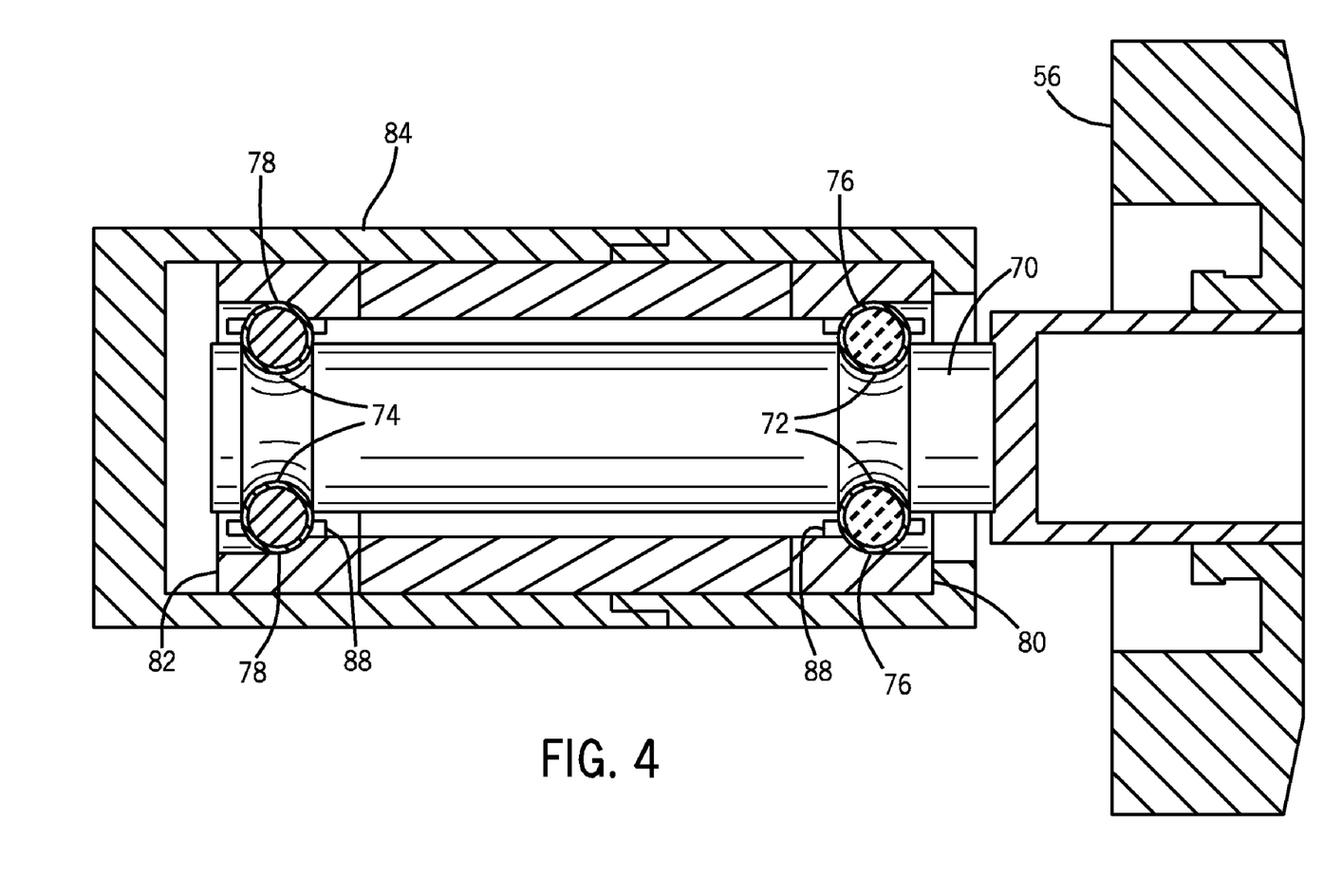
FIG. 4 is a cross-sectional view of a bearing assembly according to one embodiment of the present invention.

To reduce the heat and wear generated by friction between adjacent bearing balls 76, 78, a bearing cage or retainer is included in bearing assembly 58. As shown in FIG. 4, bearing assembly 58 includes bearing cages 88 to house the plurality of front bearing balls 76 and rear bearing balls 78, although it is also envisioned that only a single bearing cage 88 be included in the bearing assembly 58 to house either front bearing balls 76 or rear bearing balls 78. Bearing cages 88 are included at both the first and second ends 68, 70 of the bearing assembly 58 and are positioned between the front inner and outer races 72, 80 and the rear inner and outer races 74, 82, respectively. Bearing cages 88 are positioned about the bearing balls 76, 78 and are configured to prevent contact between adjacent balls. As shown in the detailed view of bearing cage 88 in FIG. 5, the bearing cage 88 is configured to evenly space the individual bearing balls 90 within apertures 91 formed in the bearing cage 88. As such, bearing cage 88 prevents impact load damage, skidding wear, and heat buildup that would occur were the bearing balls 90 allowed to make contact with one another. The alignment of the bearing balls 90 provided by bearing cage 88 also evenly distributes loads between the balls 90 associated with bearing rotation. Referring back to FIG. 4, the bearing cage 88 also accurately guides the balls in the races 72, 74, 80, 82 during rotation of the bearing assembly 58.

The bearing cages 88 are formed of a material that possesses a high specific strength and is capable of operating in an extreme high temperature environment, such as the environment present during operation of an x-ray tube. In a preferred embodiment, bearing cages 88 are formed of a carbon-carbon composite material that can withstand operation in an x-ray tube environment. It is envisioned, however, that the bearing cages 88 can also be formed from other suitable materials, such as AISI 4340 steel, that contain desired strength and temperature characteristics. Carbon-carbon composites, in particular, display a number of physical properties that make it a suitable material for construction of the bearing cages 88 for use in an x-ray tube. First, carbon-carbon composites have a high specific strength at high temperature (up to 1000° C. in vacuum), which is suitable for the high temperature environment of the x-ray tube bearing assembly. Also, carbon-carbon composites have a low coefficient of thermal expansion, which is desirable to lower strain associated with the large temperature differentials experienced in x-ray tube operation. Additionally, carbon-carbon composite materials have a low density, which serves to reduce the centrifugal force caused by the bearing cages 88 and lessen wear between the bearing cage 88 and the raceways 72, 74, 80, 82, shown in FIG. 4, as compared to denser materials. Finally, carbon-carbon composites have excellent heat transfer properties that help to reduce heat buildup in the bearing cages 88.

Figure 6:
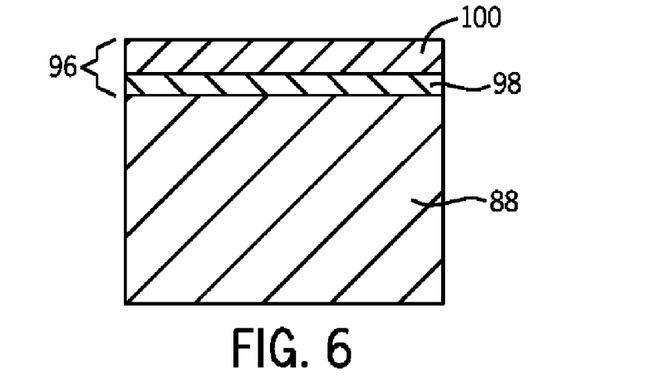
FIG. 6 is a partial cross-sectional view of a bearing cage having a combination coating according to an embodiment of the present invention.

Because of the high temperatures and high rotational speeds imposed on the bearing assembly by operation of the x-ray tube, according to another embodiment of the present invention, a coating may be applied to the carbon-carbon composite bearing cage 88 to allow it to operate more effectively by reducing part-wear and increasing lubricative properties. That is, a dry film or self-lubricating coating can be applied to bearing cage 88 for purposes of lubrication. Referring now to FIG. 6, a partial cross-sectional view of a bearing cage 88 is shown. As shown therein, a combination coating 96 is applied to the base material (i.e., carbon-carbon composite) that forms the bearing cage 88. The combination coating 96 includes a bonding layer 98 (i.e., interlayer) and a lubricant layer 100. The bonding layer 98 is formed from a bonding material (i.e., an adhesion promoter) such as platinum, tungsten, molybdenum, chromium, nickel, silicon, copper, or titanium, although it is also envisioned that other suitable materials could also be used. The bonding layer 98 promotes adhesion between lubricant layer 100 and bearing cage 88 through a finite mutual solubility with the lubricant layer material and the base material of bearing cage 88. Ti and W metals, for example, provide both mechanical adhesion provided through a deposition process and chemical adhesion between bearing cage 88 and lubricant layer 100. In one embodiment, the bonding layer 98 is deposited on bearing cage 88 with a thickness from 10-100 nanometers so as to coat the bearing cage 88. It is also envisioned that bonding layer can have a greater thickness, such as 5-20 microns for example, or alternatively, that an intermediate layer of 5-20 microns be applied to the thin 10-100 nm base bonding layer. Where bearing cage 88 is formed of a carbon-carbon composite, a thickness in the range of 5-20 microns for either bonding layer 98 or an intermediate layer can serve to, at least in part, fill-in irregularities that may be present on the carbon-carbon composite surface and present a smooth surface to which lubricant layer 100 can be applied. A smoother lubricant layer 100 will thus be formed, which may decrease wear in the bearing cage, extend bearing assembly life, and decrease subsequent machining costs. While specified thickness ranges for bonding layer 98 (and possibly an intermediate layer) have been set forth above, a thickness that is greater or lesser than these ranges can also be applied to bearing cage 88.

Figure 5:
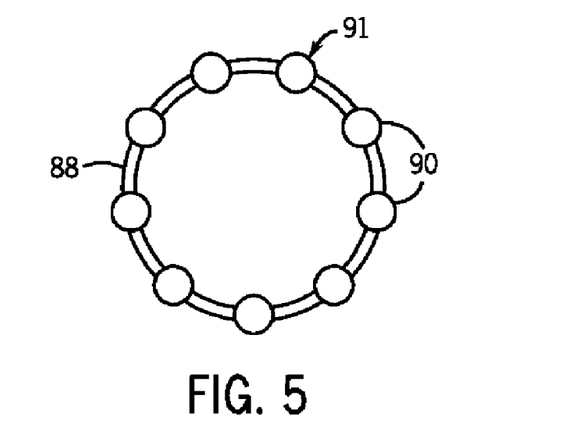
FIG. 5 is a cross-sectional view of a bearing cage according to one embodiment of the present invention

Lubricant layer 100 is deposited on top of bonding layer 98 in order to reduce friction between bearing cage 88 and the bearing balls 90 shown in FIG. 5. Lubricant layer 100 can be composed of any known dry film lubricant material suitable for use with bearings in an x-ray tube environment. Silver is typically used as a lubricant when operating temperatures in the x-ray tube environment exceed 400 degrees Celsius and serves to minimize formation of adhesive junctions between bearing cage 88, bearing balls 76, 78, and races 72, 74, 80, and 82. (shown in FIG. 4) Being a relatively soft coating, silver is able to transfer from bearing cage 88 to either of the bearing balls and the races and maintain low friction therebetween. While silver has been described as a preferred lubricant layer 100, it is also envisioned that other metallic lubricants can also be used such as gold, lead, or lead-tin. Furthermore, other solid lubricants may be added to form a "combination material" composed of, for example, silver and another lubricant, such as tungsten disulfides (WS2), molybdenum disulfide (MoS2), calcium fluoride (CaF2), $CaF_2BaF_2$ eutectics, and the like. Other advanced, high temperature, self-lubricating coatings can also be used for the bearings, such as a nano-alloyed carbon coating.

While lubricant layer 100 is shown deposited on top of bonding layer 98 in FIG. 6, it is also envisioned that lubricant layer 100 could be directly applied to the carbon-carbon composite of bearing cage 88 without any bonding layer 98 therebetween.

Figure 7:
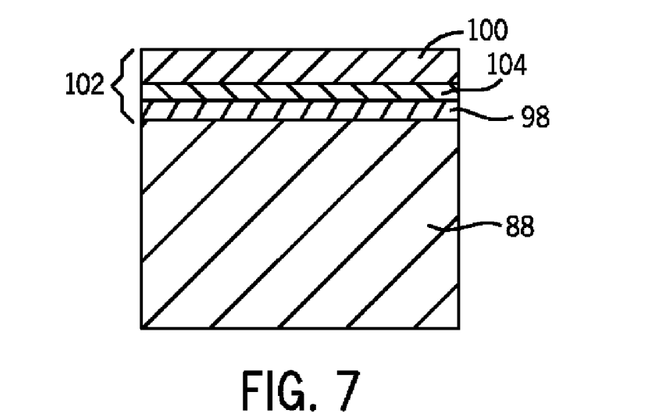
FIG. 7 is a partial cross-sectional view of a bearing cage having a gradient coating according to an embodiment of the present invention.

It is also envisioned that, rather than bonding layer 98 and lubricant layer 100 being two distinct layers, a gradient type coating can be applied to bearing cage 88. Referring now to FIG. 7, a gradient coating 102 is shown deposited on the carbon-carbon composite of bearing cage 88 that is comprised of a bonding layer 98, a transition layer 104, and a lubricant layer 100. The gradient coating 102 contains a gradual change in materials, such as from nickel to silver, that forms chemical bonds between adjoining layers and minimizes a coefficient of thermal expansion mismatch between adjacent coating layers, thus enhancing overall adhesion. For example, bonding layer 98 can be formed from 100% nickel to adhere to bearing cage 88. Transition layer 104 is positioned above bonding layer 98 and contains a percentage of bonding material therein (e.g., 50% nickel) and a percentage of a lubricant material used to form lubricant layer 100 (e.g., 50% silver). The transition layer 104 is shown as a single layer in FIG. 7, however, it is envisioned that transition layer 104 could be comprised of several layers, with each layer containing different percentages of bonding material and lubricant material so as to slowly transition from the bonding layer 98 to lubricant layer 100.

The combination coating 96 of FIG. 6 and gradient coating 102 of FIG. 7 described above can be applied to bearing cage 88 in a variety of methods. That is, bonding layer 98, lubricant layer 100, and transition layer 104 can be applied via a number of suitable techniques. In one embodiment, chemical vapor deposition (CVD), including thermal CVD, metal-organic CVD, and plasma-enhanced CVD, is used to deposit a layer 98, 100, 104 onto the carbon-carbon composite material of bearing cage 88. CVD uses a gas-phase precursor (e.g., silver halide or hydride) that is heated and flowed over the bearing cage 88 in a heated state to deposit bonding material and/or lubricant material to the bearing cage.

In another application method, a physical vapor deposition (PVD) technique is used to deposit a coating layer 98, 100, 104 onto the carbon-carbon composite material of bearing cage 88. In PVD, the bonding and/or lubricant material to be deposited on bearing cage 88 is placed in an energetic, entropic environment, so that particles of material escape its surface. For example, in an ion-plating operation, bearing cage 88 is placed in an inert gas (e.g., argon), together with the bonding/lubricant material. A heating temperature and a low-voltage arc is applied to evaporate the metallic component of the coating material (e.g., silver), and then the ionized particles are accelerated to a high energy to coat bearing cage 88 via a bombardment of these accelerated particles.

In another technique, electroplating may be used to put on a layer, layers, or gradients of layers onto the carbon-carbon material of bearing cage 88. Bearing cage 88 and the bonding/lubricant material are immersed in a solution containing one or more metal salts as well as other ions that permit the flow of electricity. A rectifier supplies a direct current to the bearing cage, causing the metal ions in solution to lose their charge and plate out the bearing cage 88. As the electrical current flows, the bonding/lubricant material slowly dissolves and replenishes the ions in the solution.

In yet another PVD application technique, a sputtering technique is employed to deposit a layer 98, 100, 104 onto the carbon-carbon composite material of bearing cage 88. In a sputtering coating technique, a thin film of bonding/lubricant material is deposited on bearing cage 88 by the ejection of atoms in a gas phase from a block of bonding/lubricant material called a target. The bonding/lubricant material atoms are ejected into the gas phase due to bombardment of the target material by energetic ions (e.g., argon plasma) and deposit on bearing cage 88 when positioned in a vacuum chamber.

It is also envisioned that various organic or inorganic based metallic pastes could be used to put on a layer, layers, or gradients of layers onto the carbon-carbon material of bearing cage 88. For example, a platinum paste with ethyl cellulose and alpha termineol could be applied to bearing cage 88. The paste could also contain oxides such as nickel oxide or titanium oxide, which could be subsequently be reduced to the base metal to form bonding layer 98 and/or lubricant layer 100. A thermal spray or "cold spray" process may also be utilized to place a layer on the carbon-carbon bearing cage 88. This material may be a metal or an oxide based material, such as NiO or TiO, that would be subsequently reduced.

In addition to the techniques set forth above, other various suitable coating techniques can also be implemented for applying a bonding layer 98 and lubricant layer 100 to the carbon-carbon composite bearing cage 88.

Figure 8:
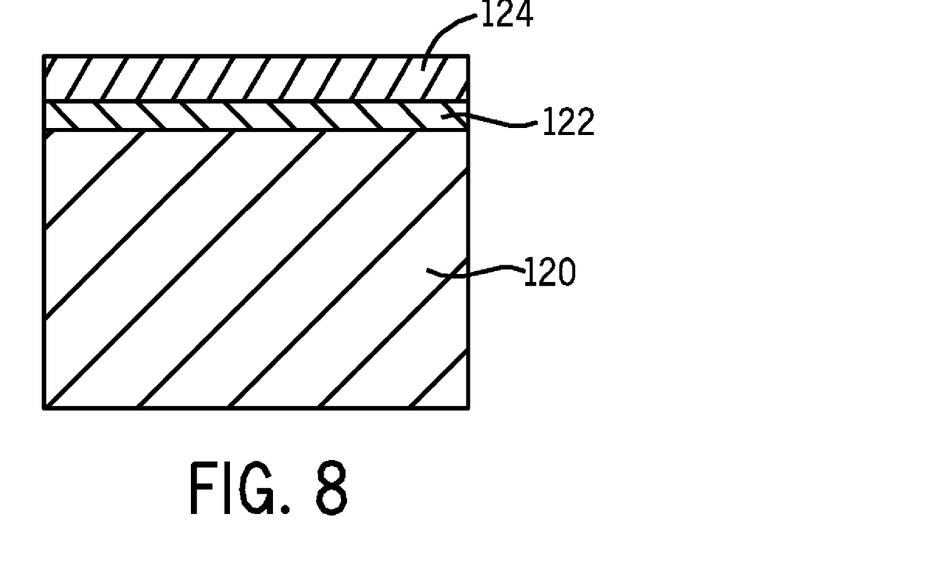
FIG. 8 is a partial cross-sectional view of a base material having a combination coating according to an embodiment of the present invention.

Alternatively, or in addition to, the combination coatings 96, 102 applied to bearing cage 88 as shown in FIGS. 6 and 7, it is also envisioned that a lubricant can also be applied to races 72, 74, 80, 82 and bearing balls 76, 78 shown in the bearing assembly 58 of FIG. 4, in order to reduce friction therebetween. Races 72, 74, 80, 82 and bearing balls 76, 78 may be comprised of tool steels typically used for bearing materials, such as Rex® 20, T5, T15 tool steels, and the like. Rex is a registered trademark of Crucible Materials Corporation, Solvay, N.Y. Bearing balls 76, 78 may also be formed from a ceramic material. Referring now to FIG. 8, a partial cross-sectional view of a base material 120 is shown from which the race and bearing balls are comprised. An adhesion layer 122 is deposited on base material 120, and a lubricant layer 124 is deposited on the adhesion layer 122. Lubricant layer 124 can be composed of silver, for example, or can further include a lubrication material other than silver such as WS2, MoS2, CaF2, CaF2BaF2 eutectics, nano-alloyed carbon, and the like. In this manner, the lubricant layer 124, together with the adhesion layer 122, enhances the lubrication performance and life of the base material 120 that forms the race and/or bearing balls.

Figure 9:
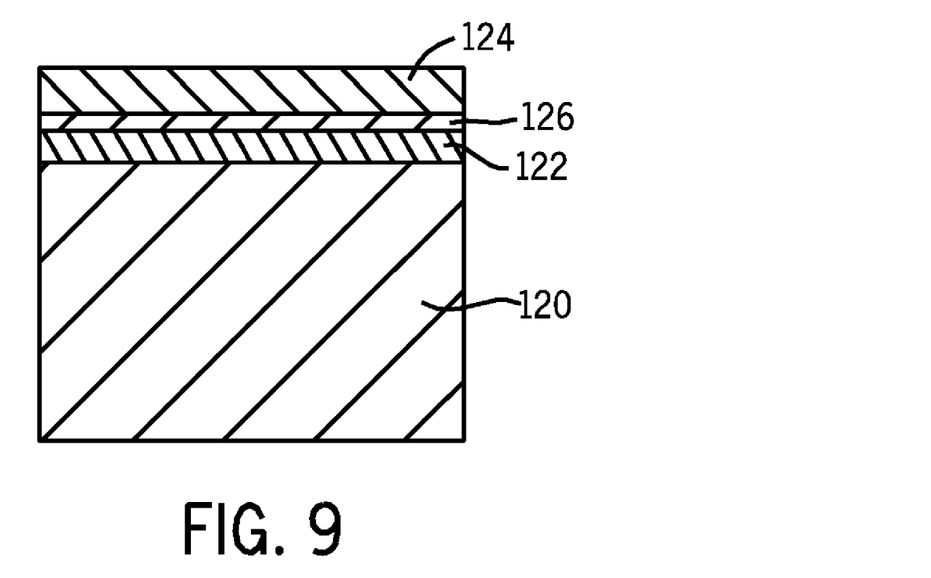
FIG. 9 is a partial cross-sectional view of a base material having a combination coating according to another embodiment of the present invention.

As shown in FIG. 9, a hardening layer 126 can also be included between adhesion layer 122 and lubricant layer 124. The hardening layer 126 is formed of a material having a hardness greater than a base material 120 of the bearing race and the bearing balls. The hard material 126 can be formed of a hard particulate comprising one of TiC, TiN, TiAlN, diamond, silicon nitride, and silicon carbide. Alternatively, the hard material 126 can be formed of a hard coating comprising one of a monolithic nitride, a nano-multilayered nitride, a nickel-diamond coating, a ceramic, and a carbon and oxide coating with lubricating phase. For example, a nanocomposite TiC—C coating consists of nanocrystalline TiC grains embedded in an amorphous carbon matrix (nc-TiC/a-C), and offers low friction, high toughness, and thus excellent tribological properties. An improved wear resistance to the base material 120 is achieved by applying a hard material 126 layer on the base material 120 and applying lubricant 124 thereto.

Figure 10:
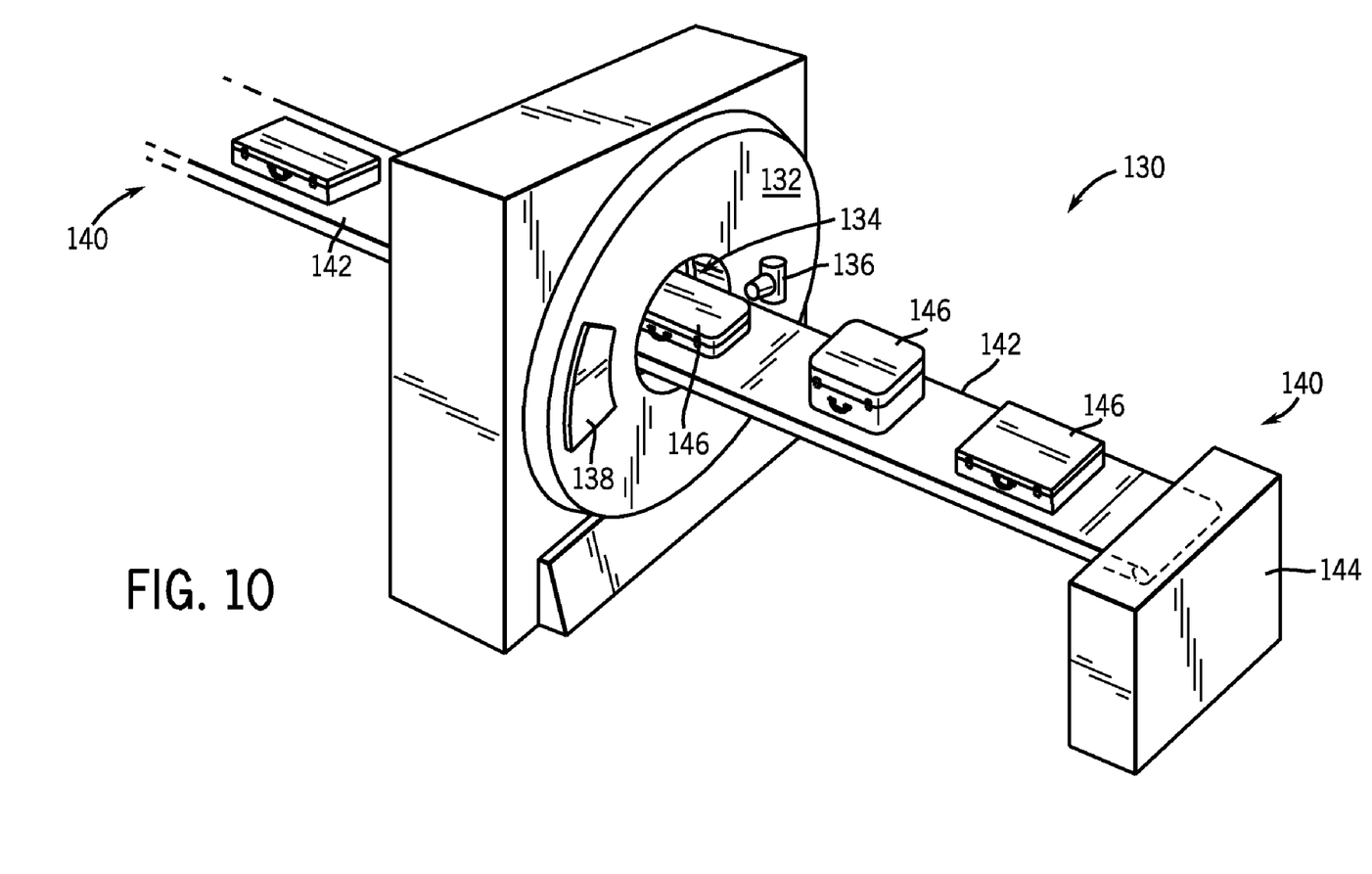
FIG. 10 is a pictorial view of a CT system for use with a non-invasive package inspection system.

FIG. 10 is a pictorial view of a CT system for use with a non-invasive package inspection system that can incorporate the x-ray tube 14 and bearing assembly 58 shown in FIG. 3. Package/baggage inspection system 130 includes a rotatable gantry 132 having an opening 134 therein through which packages or pieces of baggage may pass. The rotatable gantry 132 houses a high frequency electromagnetic energy source 136 as well as a detector assembly 138 having scintillator arrays comprised of scintillator cells. A conveyor system 140 is also provided and includes a conveyor belt 142 supported by structure 144 to automatically and continuously pass packages or baggage pieces 146 through opening 134 to be scanned. Objects 146 are fed through opening 134 by conveyor belt 142, imaging data is then acquired, and the conveyor belt 142 removes the packages 146 from opening 134 in a controlled and continuous manner. As a result, postal inspectors, baggage handlers, and other security personnel may non-invasively inspect the contents of packages 146 for explosives, knives, guns, contraband, etc.

According to one embodiment of the present invention, a bearing assembly mounted in an x-ray tube includes a bearing race, a plurality of bearing balls positioned adjacent to the bearing race, and a bearing cage positioned about the plurality of bearing balls.

According to another embodiment of the present invention, an imaging system includes an x-ray detector, an x-ray tube having a rotatable shaft, and a bearing assembly supporting the rotatable shaft. The bearing assembly further includes a bearing race, a plurality of rolling elements positioned adjacent to the bearing race, and a bearing cage configured to house the plurality of rolling elements.

According to yet another embodiment of the present invention, an x-ray tube bearing includes a raceway having an inner race and an outer race, a retainer positioned between the inner race and the outer race at each of a first end and a second end of the raceway, and a plurality of bearing balls within the retainer.

The present invention has been described in terms of the preferred embodiment, and it is recognized that equivalents, alternatives, and modifications, aside from those expressly stated, are possible and within the scope of the appending claims.

What is claimed is:

1. A bearing assembly mounted in an x-ray tube, the bearing assembly comprising:
   a bearing race;
   a plurality of bearing balls positioned adjacent to the bearing race; and
   a bearing cage positioned about the plurality of bearing balls, wherein the bearing cage comprises a carbon-carbon composite material;
   a bonding material deposited on the bearing cage; and a dry film lubricant deposited on the bonding material;

wherein the bonding material deposited between the bearing cage and the dry film lubricant has a thickness between 5 and 20 microns to fill in irregularities on a surface of the carbon-carbon composite bearing cage.

2. The bearing assembly of claim 1 wherein the dry film lubricant comprises at least one of silver, gold, lead, WS2, MoS2, CaF2, CaF2BaF2 eutectics, and amorphous carbon.

3. The bearing assembly of claim 1 wherein the bonding material comprises at least one of platinum, tungsten, molybdenum, chromium, nickel, silicon, copper, and titanium.

4. The bearing assembly of claim 1 wherein each of the plurality of bearing balls further comprises an adhesion layer and a lubrication layer deposited thereon.

5. The bearing assembly of claim 1 wherein the bearing race further comprises a lubrication coating deposited thereon.

6. The bearing assembly of claim 1 wherein one of the plurality of bearing balls and the bearing race further comprises a hard material deposited thereon having a hardness greater than a base material of the bearing race and a base material of the bearing balls.

7. The bearing assembly of claim 1 wherein the bearing cage further comprises a plurality of apertures therein to evenly space the bearing balls within the bearing cage and prevent contact between adjacent bearing balls.

8. An imaging system comprising:

an x-ray detector;

an x-ray tube having a rotatable shaft; and a bearing assembly supporting the rotatable shaft, the bearing assembly comprising:

a bearing race;

a plurality of rolling elements positioned adjacent to the bearing race;

a bearing cage constructed of a carbon-carbon composite and configured to house the plurality of rolling elements; and a combination coating deposited on the bearing cage, the combination coating including an interlayer applied to the bearing cage and a lubricant layer deposited on the interlayer;

wherein the interlayer has a thickness between 5 and 20 microns to fill in irregularities on a surface of the bearing cage and comprises at least one of platinum, tungsten, molybdenum, chromium, nickel, silicon, copper, and titanium.

9. The imaging system of claim 8 wherein the bearing race further comprises an inner race and an outer race.

10. The imaging system of claim 9 wherein the bearing cage is further configured to evenly space the plurality of rolling elements between the inner race and the outer race.

11. The imaging system of claim 8 wherein the lubricant layer comprises at least one of silver, gold, lead, WS2, MoS2, CaF2, CaF2BaF2 eutectics, and amorphous carbon.

12. The imaging system of claim 8 wherein at least one of the bearing race and the plurality of rolling elements further comprises a lubricant metal applied thereto.

13. An x-ray tube bearing comprising:

a raceway having an inner race and an outer race;

a retainer formed of a carbon-carbon composite material and positioned between the inner race and the outer race at each of a first end and a second end of the raceway;

a multi-layer coating deposited on the retainer, the multi-layer coating comprising a bonding layer deposited on the retainer and a dry film lubricating layer deposited on the bonding layer; and a plurality of bearing balls within the retainer;

wherein the bonding layer deposited on the retainer has a thickness between 5 and 20 microns to fill in irregularities on a surface of the carbon-carbon composite retainer.

14. The x-ray tube bearing of claim 13 wherein the dry film lubricating layer comprises at least one of silver, gold, lead, WS2, MoS2, CaF2, CaF2BaF2 eutectics, and amorphous carbon.

* * * * *